United States Patent
Fukuda et al.

(10) Patent No.: US 8,094,456 B2
(45) Date of Patent: Jan. 10, 2012

(54) POLISHING PAD (75) Inventors: Takeshi Fukuda, Osaka (JP); Junji Hirose, Osaka (JP); Masato Doura, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 862 days.

(21) Appl. No.: 12/095,859

(22) PCT Filed: Jan. 9, 2007

(86) PCT No.: PCT/JP2007/050072
§ 371 (c)(1),
(2), (4) Date: Jun. 2, 2008

(87) PCT Pub. No.: WO2007/080848
PCT Pub. Date: Jul. 19, 2007

(65) Prior Publication Data
US 2009/0047872 A1 Feb. 19, 2009

(30) Foreign Application Priority Data

Jan. 10, 2006 (JP) ................. 2006-002608
Jan. 13, 2006 (JP) ................. 2006-006210

(51) Int. Cl.
*H05K 7/00* (2006.01)
*H05K 3/00* (2006.01)
*B32B 15/04* (2006.01)
*B05D 5/12* (2006.01)
*B28B 1/00* (2006.01)

(52) U.S. Cl. ........ 361/748; 29/829; 427/97.1; 427/99.5; 428/457

(58) Field of Classification Search .......... None
See application file for complete search history.

(56) References Cited

U.S. PATENT DOCUMENTS

| | | | |
|---|---|---|---|
| 5,587,502 A | 12/1996 | Moren et al. | |
| 5,614,575 A | 3/1997 | Kotschwar | |
| 5,840,782 A | 11/1998 | Limerkens et al. | |
| 6,439,989 B1 | 8/2002 | Reinhardt et al. | |
| 6,477,926 B1 | 11/2002 | Swisher et al. | |
| 6,706,383 B1 * | 3/2004 | Obeng et al. ............... | 428/314.2 |

(Continued)

FOREIGN PATENT DOCUMENTS

CN 1407606 4/2003

(Continued)

OTHER PUBLICATIONS

International Preliminary Report on Patentability and written opinion mailed on Jul. 15, 2008 directed at counterpart international application PCT/JP2007/050072; 11 pages.

(Continued)

*Primary Examiner* — Allan Olsen
(74) *Attorney, Agent, or Firm* — Morrison & Foerster LLP (57) ABSTRACT

To provide a polishing pad which is insusceptible to clogging of groove with abrasive particles and grinding dusts during polishing, and leads to little decrease in polishing rate even after long-term continuous use. A polishing pad of the present invention has a polishing layer formed of polyurethane resin foam having fine-cells, and asperity structure formed in a polishing surface of the polishing layer, and is featured in that the polyurethane resin foam is a reaction cured product between isocyanate-terminated prepolymer containing high-molecular-weight polyol component and isocyanate component, and a chain extender, and contains a silicon-based surfactant having combustion residue of not less than 8 wt %.

5 Claims, 1 Drawing Sheet

U.S. PATENT DOCUMENTS

| | | | |
|---|---|---|---|
| 6,777,455 B2 | 8/2004 | Seyanagi et al. | |
| 6,837,781 B2 | 1/2005 | Hishiki | |
| 6,887,911 B2 | 5/2005 | Shidaker et al. | |
| 7,094,811 B2 | 8/2006 | Nodelman et al. | |
| 2002/0016139 A1 | 2/2002 | Hirokawa et al. | |
| 2002/0058469 A1 | 5/2002 | Pinheiro et al. | |
| 2002/0078632 A1 | 6/2002 | Hasegawa et al. | |
| 2002/0183409 A1 | 12/2002 | Seyanagi et al. | |
| 2003/0109209 A1 | 6/2003 | Hishiki | |
| 2004/0157985 A1 | 8/2004 | Masui et al. | |
| 2004/0224622 A1 | 11/2004 | Sakurai et al. | |
| 2004/0242719 A1 | 12/2004 | Seyanagi et al. | |
| 2005/0064709 A1 | 3/2005 | Shimomura et al. | |
| 2005/0176912 A1* | 8/2005 | Shin et al. | 528/44 |
| 2005/0222288 A1 | 10/2005 | Seyanagi et al. | |
| 2006/0037699 A1 | 2/2006 | Nakamori et al. | |
| 2006/0122287 A1 | 6/2006 | Yamamoto et al. | |
| 2006/0280929 A1 | 12/2006 | Shimomura et al. | |
| 2006/0280930 A1 | 12/2006 | Shimomura et al. | |
| 2007/0190905 A1 | 8/2007 | Shimomura et al. | |
| 2008/0085943 A1* | 4/2008 | Doura et al. | 521/110 |
| 2008/0305720 A1* | 12/2008 | Hirose et al. | 451/41 |
| 2008/0313967 A1 | 12/2008 | Sakurai et al. | |
| 2009/0093201 A1 | 4/2009 | Kazuno et al. | |
| 2009/0104850 A1* | 4/2009 | Ogawa et al. | 451/36 |
| 2009/0298392 A1* | 12/2009 | Okamoto et al. | 451/41 |
| 2011/0218263 A1 | 9/2011 | Kazuno et al. | |

FOREIGN PATENT DOCUMENTS

| | | |
|---|---|---|
| CN | 1586002 | 2/2005 |
| CN | 1602321 | 3/2005 |
| CN | 1628138 | 6/2005 |
| EP | 0 656 031 | 6/1995 |
| JP | 2-91279 | 3/1990 |
| JP | 6-220151 | 8/1994 |
| JP | 8-500622 | 1/1996 |
| JP | 3013105 | 1/1996 |
| JP | 8-71378 | 3/1996 |
| JP | 11-511748 | 10/1999 |
| JP | 2000-017252 | 1/2000 |
| JP | 3516874 | 6/2000 |
| JP | 2000-248034 | 9/2000 |
| JP | 2000-343412 | 12/2000 |
| JP | 2001-47355 | 2/2001 |
| JP | 2001-89548 | 4/2001 |
| JP | 2001-105300 | 4/2001 |
| JP | 2001-513450 | 9/2001 |
| JP | 2001-277101 | 10/2001 |
| JP | 2001-518852 | 10/2001 |
| JP | 2002-059358 | 2/2002 |
| JP | 2002-134445 | 5/2002 |
| JP | 2002-144220 | 5/2002 |
| JP | 2002-239905 | 8/2002 |
| JP | 3455187 | 8/2002 |
| JP | 2002-535843 | 10/2002 |
| JP | 3359629 | 12/2002 |
| JP | 2003-011066 | 1/2003 |
| JP | 2003-62748 | 3/2003 |
| JP | 2003-89051 | 3/2003 |
| JP | 2003-128910 | 5/2003 |
| JP | 2003-145414 | 5/2003 |
| JP | 2003-171433 | 6/2003 |
| JP | 2003-218074 | 7/2003 |
| JP | 3490431 | 1/2004 |
| JP | 3571334 | 2/2004 |
| JP | 2004-75700 | 3/2004 |
| JP | 2004-167680 | 6/2004 |
| JP | 2004-188716 | 7/2004 |
| JP | 2004-193390 | 7/2004 |
| JP | 2004-211076 | 7/2004 |
| JP | 2004-330411 | 11/2004 |
| JP | 2005-52907 | 3/2005 |
| JP | 2005-68174 | 3/2005 |
| JP | 2005-68175 | 3/2005 |
| JP | 2005-120275 | 5/2005 |
| JP | 2005-517060 | 6/2005 |
| WO | WO-94/04599 | 3/1994 |
| WO | WO-96/38453 | 12/1996 |
| WO | WO-98/45087 | 10/1998 |
| WO | WO-99/07515 | 2/1999 |
| WO | WO-00/43159 | 7/2000 |
| WO | WO-01/96434 | 12/2001 |
| WO | WO-02/24415 | 3/2002 |
| WO | WO-02/083757 | 10/2002 |
| WO | WO 03/043071 A1 | 5/2003 |
| WO | WO-03/066703 | 8/2003 |
| WO | WO-2004/049417 | 6/2004 |
| WO | WO-2004/055089 | 7/2004 |

OTHER PUBLICATIONS

Taiwanese Office Action mailed Nov. 17, 2010, directed to counterpart Taiwanese Application No. 096100913; 7 pages.

International Search Report mailed Mar. 6, 2007, directed to counterpart international application No. PCT/JP2007/050072; 3 pages.

Matsunaga, Katsuharu. (2005). "Hard Foam" Section 7.4.3. *In The Comprehensive Materials and Technology for a Novel Polyurethan Production*. First Print, Kabushiki Kaisha CMC Shuppan, pp. 107-108.

International Search Report mailed Aug. 8, 2006 directed to Application No. PCT/JP2006/309380;11 pages.

International Search Report mailed Nov. 21, 2006, directed to Application No. PCT/JP2006/316372; 4 pages.

Korean Office Action mailed Jul. 7, 2011, directed to Korean Application No. 10-2009-7013449; 5 pages.

Korean Office Action mailed Jul. 7, 2011, directed to Korean Application No. 10-2009-7013450; 6 pages.

International Preliminary Report on Patentability, mailed Mar. 13, 2008, directed to Application No. PCT/JP2006/316372; 6 pages.

Chinese Office Action mailed May 8, 2009, directed to Chinese Application No. 2006800321010; 5 pages.

Chinese Office Action issued Nov. 21, 2008, directed to Chinese Application No. 200680017384.1; 9 pages.

Chinese Office Action issued Jul. 10, 2009, directed to Application No. 200680017384.1; 6 pages.

Chinese Office Action issued Mar. 23, 2010, directed to Chinese Application No. 200910135488.8; 13 pages.

Chinese Office Action issued Apr. 22, 2010, directed to Chinese Application No. 200910135487.3; 17 pages.

Chinese Second Office Action issued Apr. 13, 2011, directed to Chinese Application No. 200910135487.3; 16 pages.

Chinese Second Office Action mailed Nov. 23, 2010, directed to Chinese Patent Application No. 200910135488.8; 14 pages.

Japanese Notification of Reasons for Refusal mailed Mar. 15, 2011, directed to Japanese Application No. 2005-144304; 6 pages.

Japanese Notification of Reasons for Refusal mailed Mar. 15, 2011, directed to Japanese Application No. 2005-144292; 6 pages.

Japanese Notification of Reasons for Refusal mailed Mar. 15, 2011, directed to Japanese Application No. 2005-144318; 6 pages.

International Search Report mailed May 30, 2006, directed to Application No. PCT/JP2006/303605; 4 pages.

Chinese Office Action issued Jan. 8, 2010, directed to Chinese Application No. 200680004397.5; 25 pages.

Japanese Notification of Reasons for Refusal mailed Nov. 25, 2010, directed to Japanese Application No. 2006-002346; 4 pages.

Japanese Notification of Reasons for Refusal mailed Nov. 25, 2010, directed to Japanese Application No. 2006-005803; 4 pages.

Japanese Notification of Reasons for Refusal mailed May 27, 2011, directed to Japanese Application No. 2006-005787; 6 pages.

Chinese Second Office Action issued May 5, 2011, directed to Chinese Application No. 200680004397.5; 21 pages.

Decision of Refusal mailed Jun. 24, 2011, directed to Japanese Application No. 2005-144304; 4 pages.

Decision of Refusal mailed Jun. 28, 2011, directed to Japanese Application No. 2005-144292; 4 pages.

Decision of Refusal mailed Jun. 28, 2011, directed to Japanese Application No. 2005-144318; 4 pages.

Doura et al., U.S. Office Action mailed Jul. 8, 2011, directed to U.S. Appl. No. 11/794,284; 6 pages.

Doura et al., U.S. Office Action mailed Jul. 22, 2010, directed to U.S. Appl. No. 11/794,284; 7 pages.

Kazuno et al., U.S. Office Action mailed Dec. 6, 2010, directed to U.S. Appl. No. 11/914,547; 15 pages.

Kazuno et al., U.S. Office Action mailed Jun. 23, 2011, directed to U.S. Appl. No. 11/914,547; 12 pages.

Ogawa et al., U.S. Office Action mailed Dec. 21, 2010, directed to U.S. Appl. No. 12/065,219; 10 pages.

Ogawa et al., U.S. Office Action mailed May 11, 2011, directed to U.S. Appl. No. 12/065,219; 11 pages.

Japanese Notification of Reasons for Refusal mailed Jul. 12, 2011, directed to Japanese Application No. 2006-002346; 6 pages.

Chinese Rejection Decision mailed Jul. 29, 2011, directed to Chinese Application No. 200910135487.3; 14 pages.

Japanese Notification of Reasons for Refusal mailed Aug. 9, 2011, directed to U.S. Application No. 2005-249046; 6 pages.

Japanese Notification of Reasons for Refusal mailed Aug. 17, 2011, directed to U.S. Application No. 2006-006210; 5 pages.

Chinese 3$^{rd}$ Office Action mailed Aug. 29, 2011, directed to Chinese Patent Application No. 200680004397.5; 16 pages.

* cited by examiner

POLISHING PAD

REFERENCE TO RELATED APPLICATIONS

This application is a national stage application under 35 USC 371 of International Application No. PCT/JP2007/050072, filed Jan. 9, 2007, which claims the priority of Japanese Patent Application Nos. 2006-002608 and 2006-006210, filed Jan. 10, 2006, and Jan. 13, 2006, respectively, the contents of which prior applications are incorporated herein by reference.

TECHNICAL FIELD

The present invention relates to a polishing pad that enables planarization process of materials for which high surface planarity is required, such as planarization of optical materials such as reflection mirror, silicon wafer, glass substrate for hard disc, aluminum substrate, and general metal polishing process, with excellent stability and high polishing efficiency. The polishing pad of the present invention is suited, in particular, for use in planarization process which is executed before lamination and formation of an oxide layer and metal layer in a device having such an oxide layer and a metal layer formed on a silicon wafer.

BACKGROUND OF THE INVENTION

Representative materials for which high surface planarity is required include disks of single-crystal silicon, called "silicon wafer" for used in production of semiconductor integrated circuits (IC, LSI). Silicon wafer is required to have surface which is finished to be highly planar in respective steps of lamination and formation of oxide layer and metal layer, in order to give reliable semiconductor junction of various thin film used for formation of circuit in manufacturing process of IC, LSI and the like. In such a polishing finish process, generally, a polishing pad is fixed to a rotatable supporting disk, which is called "platen", and an object to be processed such as semiconductor wafer is fixed to a polishing head. Relative motions of these generate relative velocity between the platen and polishing head, and polishing operation is executed by continuous supply of a polishing slurry containing abrasive grains onto the polishing pad.

As the polishing characteristics of polishing pad, excellent planarity and surface uniformity of object to be polished, and high polishing rate are demanded. The planarity and surface uniformity of object to be polished may be improved to some extent by increasing the modulus of the polishing layer. As for the polishing rate, it may be improved by increasing the retaining amount of slurry by making a foam containing cells.

As a method for increasing the retaining amount of slurry, the polishing pad per se may be made into hydrophilic, and concrete examples of such a method include: (1) introducing a hydrophilic group such as a hydroxyl group into a matrix material, and (2) mixing a matrix material and a hydrophilic substance. For example, there is disclosed a composition for polishing pad comprising (A) cross-linked elastomer, and (B) substance having a functional group such as a hydroxyl group (Patent document 1). Also disclosed is a polishing tool in which a hydrophilic substance is added to a material constituting the polishing tool, or a polishing tool attached (modified) with a hydrophilic group (Patent document 2). Also disclosed is a polishing pad formed of thermosetting polymer matrix resin containing a sheet-like substance which is hydrophilic and substantially insoluble in water (Patent document 3). Also disclosed is a polishing pad formed of polyurethane composition containing a urethane resin in which a compound having hydrophilic group is copolymerized, and a hydrophilizing agent (Patent document 4).

However, in the method of (1), when the matrix material is polyurethane, a hydrophilic group such as a hydroxyl group containing active hydrogen will react with an isocyanate group during synthesis of polyurethane, so that an unreacted polyol component may remain in the material. This remaining polyol may provide plasticizing effect, which may cause deterioration in the property of the polishing pad. Further, in the method of (2), it is difficult to uniformly mix the hydrophilic substance into the matrix material, and hence a polishing pad having uniform property cannot be obtained.

On the other hand, when the polishing rate changes before completion of use from directly after starting of use, the polishing condition should be adjusted, which leads the problem of poor polishing efficiency.

For example, there is a disclosure about a polishing material formed of a polishing material composition comprising an isocyanate-terminated urethane polymer and an active hydrogen containing compound wherein the isocyanate-terminated urethane polymer uses aromatic diisocyanate as polyisocyanate, and wherein a lower molecular polyol in the polyol component composed of high-molecular-weight polyol and low-molecular-weight polyol is obtained by using diethyleneglycol, 1,3-butyleneglyocol and the like, with the intention of providing a non-foaming urethane polishing material capable of efficiently polishing a semiconductor wafer and having excellent planarity (Patent document 5).

The polishing material disclosed in Patent document 5 is formed of non-foaming urethane, and such a non-foaming polishing material has a groove formed on the polishing surface because the polishing rate is low. And since abrasive grains in slurry and grinding dusts localize, it is very difficult to stabilize the polishing rate.

Further, a conventional grooved polishing pad has the problem that the groove is clogged with abrasive grains or grinding dusts during polishing, and the polishing rate is decreased with use.

With the intention of increasing the polishing rate, there is disclosed a polishing pad containing a silicone-based surfactant which is copolymer of a polyalkylsiloxane and a polyether having a number of independent cells of 200 to 600 cells/mm$^2$, and an average cell diameter of 30 to 60 µm (Patent document 6). However, the polishing pad disclosed in Patent document 6 has some problem in stability of polishing rate because the groove is susceptible to clogging with abrasive grains or grinding dusts during polishing despite of high polishing rate.

Patent document 1: Japanese Unexamined Patent Publication No. 2002-134445
Patent document 2: Japanese Unexamined Patent Publication No. 2003-11066
Patent document 3: Japanese Unexamined Patent Publication No. 2002-59358
Patent document 4: Japanese Unexamined Patent Publication No. 2003-128910
Patent document 5: Japanese Unexamined Patent Publication No. 2000-17252
Patent document 6: Japanese Patent No. 3455208, specification

SUMMARY OF THE INVENTION

It is an object of the present invention to provide a polishing pad which is insusceptible to clogging of groove with abrasive particles and grinding dusts during polishing, and leads little decrease in polishing rate even after long-term continuous use. Also it is an object of the present invention to provide a method of producing a semiconductor device using such a polishing pad.

Inventors of the present invention made diligent efforts for solving the above object, and found that the object can be achieved by the polishing pad shown below, and finally accomplished the present invention.

Specifically, the present invention relates to a polishing pad having a polishing layer formed of polyurethane resin foam having fine-cells, polishing surface of the polishing layer being formed with asperity structure, wherein the polyurethane resin foam is a reaction cured product between isocyanate-terminated prepolymer containing high-molecular-weight polyol component and isocyanate component, and a chain extender, and contains a silicon-based surfactant having combustion residue of not less than 8 wt %.

Gradual decrease in polishing rate as the polishing operation is conducted using a conventional grooved polishing pad is ascribable to the following reasons. On the surface of the grooved polishing pad, a groove is formed for retaining and refreshing the polishing slurry, and for removing generated grinding dusts. However, in a conventional polishing pad, abrasive grains in polishing slurry or grinding dusts are likely to clog the groove. Therefore, it is necessary to often grind the surface of the polishing pad by dressing to refresh it to new surface. The expected reasons why the conventional polishing pad is susceptible to clogging are as follows: 1) high specific gravity of polishing layer, and 2) "viscosity" originating from material of polishing layer. It is supposed that in particular, when the material of the polishing layer has "viscosity", the grinding dusts in polishing layer generating at the time of polishing increase, so that the grinding dusts are more likely to clog the groove and cause plugging.

Inventors of the present invention found that by adding a silicon-based surfactant having combustion residue (SiO, $SiO_2$, and SiC etc.) of 8 wt % or more into a polyurethane resin foam, a material which forms a polishing layer, it is possible to reduce the cell diameter of independent cell and increase the number of cells, and to reduce grinding dusts of polishing layer generating in polishing. It can be expected that the reduced grinding dusts alleviated clogging the groove with the grinding dusts.

Preferably, the silicon-based surfactant is a copolymer of polyalkylsiloxane and polyether, and the molar ratio between ethyleneoxide and propyleneoxide in the polyether is 60/40 to 100/0 (former/latter). By using the silicon-based surfactant, it is possible to make the cell diameter of independent cell in the polyurethane resin foam much smaller, and to further increase the number of cells, resulting that the grinding dusts can be further reduced.

Preferably, the polyurethane resin foam of the present invention contains the silicon-based surfactant in an amount of 0.05 wt % or more and less than 10 wt %, and more preferably in an amount of 0.5 to 5 wt %. When the amount of silicon-based surfactant is less than 0.05 wt %, a foam of fine-cells may not be obtained. On the other hand, when it is 10 wt % or more, it may be difficult to obtain a polyurethane resin foam of high rigidity because of plasticizing effect of the silicon-based surfactant.

The polyurethane resin foam has preferably an average cell diameter of 50 μm or less, and a cell number of 200 cells/$mm^2$ or more, and more preferably an average cell diameter of 45 μm or less, and a cell number of 250 cells/$mm^2$ or more.

Further, the present invention also relates to a method of producing a semiconductor device comprising the step of polishing surface of a semiconductor wafer using the above polishing pad.

DETAILED DESCRIPTION OF THE INVENTION

The polishing pad of the present invention comprises a polyurethane resin foam having fine-cells, and has a polishing layer having asperity structure on polishing surface. The polishing pad of the present invention may comprise only the polishing layer, or may be a laminate of the polishing layer and other layer (for example, cushion layer).

Isocyanate-terminated prepolymer used in the present invention comprises at least an isocyanate component and a high-molecular-weight polyol component as raw materials. By using an isocyanate-terminated prepolymer, physical characteristics of the obtained polyurethane resin foam are improved.

As the isocyanate component, any compounds known in the art of polyurethane may be used without any particular limitation. Examples of the isocyanate component include aromatic diisocyanates such as 2,4-toluene diisocyanate, 2,6-toluene diisocyanate, 2,2'-diphenylmethane diisocyanate, 2,4'-diphenylmethane diisocyanate, 4,4'-diphenylmethane diisocyanate, 1,5-naphthalene diisocyanate, p-phenylene diisocyanate, m-phenylene diisocyanate, p-xylylene diisocyanate, and m-xylylene diisocyanate; aliphatic diisocyanates such as ethylene diisocyanate, 2,2,4-trimethylhexamethylene diisocyanate, and 1,6-hexamethylene diisocyanate; alicyclic diisocyanates such as 1,4-cyclohexane diisocyanate, 4,4'-dicyclohexylmethane diisocyanate, isophorone diisocyanate, and norbornane diisocyanate. These may be used singly or in combination of two or more kinds. The diisocyanate may be modified by urethane modification, allophanate modification, biuret modification, isocyanurate modification and the like.

As the high-molecular-weight polyol component, those usually used in the art of polyurethane can be exemplified. Examples thereof include polyether polyols represented by polytetramethylene ether glycol and polyethylene glycol; polyester polyols represented by polybutylene adipate; polyester polycarbonate polyols exemplified by reaction products of polyester glycol such as polycaprolactone polyol or polycaprolactone and alkylene carbonate; polyester polycarbonate polyols obtained by reacting ethylene carbonate with polyvalent alcohol and the reacting the resultant reaction mixture with an organic dicarboxylic acid; and polycarbonate polyols obtained by ester exchange reaction between polyhydroxyl compound and aryl carbonate. These may be used singly or in combination of two or more kinds. Among these, polytetramethylene ether glycol is particularly preferably used.

Number average molecular weight of the high-molecular-weight polyol component is not particularly limited, however, from the viewpoint of modulus characteristic of obtainable polyurethane resin it is preferably in the range of 500 to 1500. When the number average molecular weight is less than 500, a polyurethane resin obtained therefrom do not have sufficient modulus characteristic, and is likely to be a brittle polymer. And thus, a polishing pad formed of such polyurethane resin is too hard, and result in occurrence of scratch on surface of an object to be polished. Also it is undesired from the viewpoint of life time of polishing pad because ablation is more likely to occur. On the other hand, number average molecular weight exceeding 1500 is not favorable because a polishing pad formed of a polyurethane resin obtainable therefrom is too soft to obtain sufficiently satisfactory planarity.

Besides the above high-molecular-weight polyol component described in the above as a polyol component, it is preferred to concomitantly use a low-molecular-weight component such as ethyleneglycol, 1,2-propylene glycol, 1,3-propylene glycol, 1,4-butanediol, 1,6-hexanediol, neopentylglycol, 1,4-cyclohexanedimethanol, 3-methyl-1,5-pentanediol, diethyleneglycol, triethyleneglycol, 1,4-bis(2-hydroxyethoxy)benzene, trimethylolpropane, glycerin, 1,2,6-hexanetriol, pentaerythritol, tetramethylol cyclohexane, methylglucoside, sorbitol, mannitol, dulcitol, sucrose, 2,2,6,6-tetrakis(hydroxymethyl)cyclohexanol, and triethanol amine. Low-molecular-weight polyamine component such as ethylenediamine, tolylenediamine, diphenylmethanediamine, and diethylenetriamine may be used. These may be used singly or in combination of two or more kinds. Molecular weight of low-molecular-weight polyol component and low-molecular-weight polyamine component is less than 500, and preferably 250 or less.

Preferably, the isocyanate-terminated prepolymer is preferably produced by heating reaction of isocyanate component, high-molecular-weight polyol component, low-molecular-weight polyol component and so on so that equivalent ratio (NCO/H*) of isocyanate group (NCO) and active hydrogen (H*) is 1.2 to 5.0, and preferably 1.6 to 2.6. When the equivalent ratio is less than 1.2, the prepolymer tends to polymerize to turn into solid or gel at the time of synthesis. On the other hand, when the equivalent ratio is more than 5.0, the reaction with a chain extender accelerates because there remains significant amount of unreacted isocyanate, which may deteriorate the molding workability of the polyurethane resin foam and planarity characteristic of the polishing pad.

As the isocyanate-terminated prepolymer, those having a molecular weight ranging from about 800 to 5000 are preferred because of their excellent workability, physical characteristic and the like.

The chain extender is an organic compound having at least two active hydrogen groups, and examples of the active hydrogen group include a hydroxyl group, primary or secondary amino group, thiol group (SH) and the like. Concrete examples include polyamines such as 4,4'-methylenebis(o-chloroaniline) (MOCA), 2,6-dichloro-p-phenylenediamine, 4,4'-methylenebis(2,3-dichloroaniline), 3,5-bis(methylthio)-2,4-toluenediamine, 3,5-bis(methylthio)-2,6-toluenediamine, 3,5-diethyltoluene-2,4-diamine, 3,5-diethyltoluene-2,6-diamine, triethyleneglycol-di-p-aminobenzoate, polytetramethyleneoxide-di-p-aminobenzoate, 1,2-bis(2-aminophenylthio)ethane, 4,4'-diamino-3,3'-diethyl-5,5'-dimethyldiphenylmethane, N,N'-di-sec-butyl-4,4'-diaminodiphenylmethane, 4,4'-diamino-3,3'-dimethyldiphenylmethane, 4,4'-diamino-3,3'-diethyl-5,5'-dimethyldiphenylmethane, 4,4'-diamino-3,3'-diisopropyl-5,5'-dimethyldiphenylmethane, 4,4'-diamino-3,3',5,5'-tetraethyldiphenylmethane, 4,4'-diamino-3,3',5,5'-tetraisopropyldiphenylmethane, m-xylylenediamine, N,N'-di-sec-butyl-p-phenylenediamine, m-phenylenediamine, and p-xylylenediamine. An alternative example is the aforementioned low-molecular-weight polyol component. These may be used singly or in combination of two or more kinds.

The ratio between isocyanate-terminated prepolymer and chain extender may be variably changed depending on the respective molecular weights and desired physical properties of a polishing pad to be produced therefrom. In order to obtain a polishing pad having desired polishing characteristic, the number of isocyanate groups in the prepolymer, relative to the number of functional groups in the chain extender is preferably in the range of 0.95 to 1.20, and more preferably in the range of 0.99 to 1.15.

A polyurethane resin foam may be produced by known urethanation technique such as fusion technique or solution technique with modification, however, production using fusion technique is preferred in consideration of cost and operation environment.

A polyurethane resin foam is produced by mixing and curing a first component containing an isocyanate-terminated prepolymer and a second component containing a chain extender.

A polyurethane resin foam of the present invention is produced by a mechanical foaming method using a silicon-based surfactant. As the silicon-based surfactant, those having combustion residue ($SiO$, $SiO_2$, and $SiC$ etc.) of 8 wt % or more, preferably 10 wt % or more should be used. When the combustion residue is less than 8 wt %, the ratio of silicon atoms in the silicon-based surfactant is relatively small, which makes it difficult to reduce the cell diameter of independent cell and increase the cell number. Therefore, grinding dusts of the polishing layer generating at the time of polishing increase, and the grinding dusts become more likely to clog the groove. Combustion residue is determined according to the measurement method as described in examples.

Preferably, the silicon-based surfactant is a copolymer of polyalkylsiloxane and polyether, and a molar ratio between ethyleneoxide and propyleneoxide in the polyether is in the range of 60/40 to 100/0 (former/latter). A terminal substituent of the silicon-based surfactant may be an alkoxyl group or a hydroxyl group. As such a silicon-based surfactant, SZ-1645, SZ-1718, SF-2937F, SF-2938F (available from TORAY Dow Corning Silicone Co., Ltd.), and B-8465 (available from Goldschmidt) and the like can be exemplified as a preferred compound.

A stabilizer such as antioxidant, a lubricant, a pigment, a filler, an antistatic agent and other additives may also be added as necessary.

The following is explanation of one exemplary production method of polyurethane resin foam of fine-cell type constituting a polishing pad (polishing layer). This production method of polyurethane resin foam includes the following steps:

1) Foaming Step for Preparing a Bubble Dispersion Liquid of an Isocyanate-Terminated Prepolymer The aforementioned silicon-based surfactant is added to an isocyanate-terminated prepolymer, and stirred in the presence of non-reactive gas to make the non-reactive gas be dispersed as fine bubbles, to give a bubble dispersion liquid. When the prepolymer is solid at room temperature, the prepolymer is preheated and fused at an appropriate temperature before use.

2) Curing Agent (Chain Extender) Mixing Step

A chain extender is added, mixed and stirred to the bubble dispersion liquid to give a foam reaction solution.

3) Casting Step

The foam reaction solution is poured into a mold.

4) Curing Step

The foam reaction solution that is poured into the mold is heated and allowed to react and cure.

As the non-reactive gas used for formation of fine bubbles is preferably noncombustible, and concrete examples include nitrogen, oxygen, carbon dioxide gas, rare gas such as helium and argon, and mixture thereof, and using air after removal of moisture by drying is most preferred from the view point of cost.

As a stirrer for use in making the non-reactive gas into fine bubbles and dispersing them into the isocyanate-terminated prepolymer, a known stirrer may be used without any particular limitation, and concrete examples of such stirrer include homogenizer, dissolver, biaxial planetary mixer (planetary mixer) and the like. The profile of the stirring blade of the stirrer is not particularly limited, however, use of whipper-type stirring blade is preferred because fine-cells are obtained.

In a preferable mode, different stirrers are used in stirring for forming a bubble dispersion liquid in the stirring step and in stirring for mixing an added chain extender in the mixing step, respectively. In particular, stirring in the mixing step may not be stirring for forming bubbles, and a stirrer not generating large bubbles is preferably used. Such a stirrer is preferably a planetary mixer. The same stirrer may be used in the stirring step and the mixing step, and stirring conditions such as revolution rate of the stirring blade are preferably regulated as necessary.

In the method of producing the polyurethane resin foam with fine-cells, heating and post-curing of the foam obtained after casting and reacting the foam reaction solution in a mold until the dispersion lost fluidity are effective in improving the physical properties of the foam, and are extremely preferable. The foam reaction solution may be cast in a mold and immediately post-cured in a heating oven, and even under such conditions, heat is not immediately conducted to the reactive components, and thus the diameters of cells are not increased. The curing reaction is conducted preferably at normal pressures to stabilize the shape of cells.

In the polyurethane resin foam, a known catalyst that promotes polyurethane reaction such as tertiary amine-based catalyst may be used. The kind and adding amount of catalyst are selected in consideration of flow time in which it is poured into a certain shape of mold after mixing step.

The polyurethane resin foam may be produced by a batch system in which individual components are measured and put into a container and stirred, or a continuous production system in which individual components and non-reactive gas are continuously supplied to a stirrer and stirred and the foam reaction solution is sent out to produce a molded product.

An alternative method involves putting a prepolymer which is a material for the polyurethane resin foam into a reaction vessel, adding a chain extender, stirring the mixture, pouring the resultant mixture into a mold of predetermined size to prepare a block, and slicing the block with a slicer in the form of plane or bandsaw. Alternatively, a thin sheet may be formed in the step of pouring into a mold. Alternatively, the resin which is to be a material is dissolved, and extruded from a T die to directly prepare a sheet-like polyurethane resin foam.

Preferably, the polyurethane resin foam has an average cell diameter of 50 μm or less, and a cell number of 200 cells/mm$^2$ or more, and more preferably, an average cell diameter of 45 μm or less, and a cell number of 250 cells/mm$^2$ or more. Outside these ranges, the grinding dusts of the polishing layer increase, so that the grinding dusts tend to clog the groove.

Preferably, the polyurethane resin foam has a specific gravity ranging from 0.5 to 1.0. When the specific gravity is less than 0.5, the surface strength of the polishing pad (polishing layer) decreases, so that the planarity of the wafer tends to decrease. When the specific gravity is larger than 1.0, the cell number on the surface of the polishing pad decreases, so that the polishing rate tends to decrease despite excellent planarity.

Preferably, the polyurethane resin foam has a hardness measured by ASKER D hardness meter, ranging from 45 to 65 degrees. When the ASKER D hardness is less than 45 degrees, the planarity of the wafer decreases, while when the hardness is more than 65 degrees, the uniformity of the wafer tends to decrease despite excellent planarity.

A polishing surface of the polishing pad (polishing layer) of the present invention, which comes into contact with an object to be polished has a asperity structure provided for retaining and refreshing a slurry. A polishing layer made of a foam has a number of openings in the polishing surface, and has a function of retaining and refreshing a slurry. By forming an asperity structure on the polishing surface, it is possible to conduct retention and refreshment of the slurry more efficiently, and to prevent the object to be polished from breaking due to adsorption of the material to be polished. The shape of the asperity structure is not particularly limited insofar as it is able to retain and refresh a slurry, and for example, XY grating groove, concentric ring groove, through-hole, non-through-hole, polygonal column, circular cylinder, spiral groove, eccentric ring groove, radial groove, and combination thereof can be recited. These asperity structures generally have regularity, however, groove pitch, groove width, groove depth and the like may be varied by a certain range for achieving desired retention and refreshment of slurry.

A preparation method of the asperity structure is not particularly limited. Examples of preparation method include the method of machine cutting using a jig such as a bite of predetermined size, the preparation method of pouring a resin into a mold having a predetermined surface shape, and allowing the resin to harden, the preparation method of pressing a resin with a pressing plate having a predetermined surface shape, the preparation method of using photolithography, the preparation method using printing techniques, and the preparation method based on laser beam using carbon dioxide gas laser or the like.

The thickness of the polishing layer is generally, but is not limited to, about 0.8 to 4 mm, and preferably 1.0 to 2.5 μm. As a method of preparing a polishing layer having the above thickness, the method of making a block of the fine-foam to have a predetermined thickness by using a slicer of bandsaw or planer type, the method of pouring a resin into a mold having a cavity of predetermined thickness and allowing the resin to cure, and the method of using coating techniques and sheet forming techniques can be exemplified.

The range of the thickness of the polishing layer is preferably 100 μm or less. When the range of the thickness is higher than 100 μm, large undulation is caused to generate portions different in a contacting state with an object of polishing, thus adversely influencing polishing characteristics. To solve the range of the thickness of the polishing layer, the surface of the polishing layer is dressed generally in an initial stage of polishing by a dresser having abrasive grains of diamond deposited or fused thereon, but the polishing layer outside of the range described above requires a longer dressing time to reduce the efficiency of production.

As a method of suppressing the range of thickness, there is also a method of buffing the surface of the polishing layer having a predetermined thickness. Buffing is conducted preferably stepwise by using polishing sheets different in grain size.

A polishing pad of the invention may also be a laminate of a polishing layer and a cushion sheet adhered to each other.

The cushion sheet (cushion layer) compensates for characteristics of the polishing layer. The cushion layer is required for satisfying both planarity and uniformity which are in a tradeoff relationship in CMP. Planarity refers to flatness of a pattern region upon polishing an object of polishing having fine unevenness generated upon pattern formation, and uniformity refers to the uniformity of the whole of an object of polishing. Planarity is improved by the characteristics of the polishing layer, while uniformity is improved by the characteristics of the cushion layer. The cushion layer used in the polishing pad of the present invention is preferably softer than the polishing layer.

The material forming the cushion layer is not particularly limited, and examples of such material include a nonwoven fabric such as a polyester nonwoven fabric, a nylon nonwoven fabric or an acrylic nonwoven fabric, a nonwoven fabric impregnated with resin such as a polyester nonwoven fabric impregnated with polyurethane, polymer resin foam such as polyurethane foam and polyethylene foam, rubber resin such as butadiene rubber and isoprene rubber, and photosensitive resin.

Means for adhering the polishing layer to the cushion layer include: for example, a method in which a double sided tape is sandwiched between the polishing layer and the cushion layer, followed by pressing.

The double sided tape is of a common construction in which adhesive layers are provided on both surfaces of a substrate such as a nonwoven fabric or a film. It is preferable to use a film as a substrate with consideration given to prevention of permeation of a slurry into a cushion sheet. A composition of an adhesive layer is, for example, of a rubber-based adhesive, an acrylic-based adhesive or the like. An acrylic-based adhesive is preferable because of less of a content of metal ions, to which consideration is given. Since a polishing layer and a cushion sheet is sometimes different in composition from each other, different compositions are adopted in respective adhesive layers of double sided tape to thereby also enable adhesive forces of the respective adhesive layers to be adjusted to proper values.

A polishing pad of the invention may be provided with a double sided tape on the surface of the pad adhered to a platen. As the double sided tape, a tape of a common construction can be used in which adhesive layers are, as described above, provided on both surfaces of a substrate. As the substrate, for example, a nonwoven fabric or a film is used. Preferably used is a film as a substrate since separation from the platen is necessary after the use of a polishing pad. As a composition of an adhesive layer, for example, a rubber-based adhesive or an acrylic-based adhesive is exemplified. Preferable is an acrylic-based adhesive because of less of metal ions in content to which consideration is given.

Figure 1:
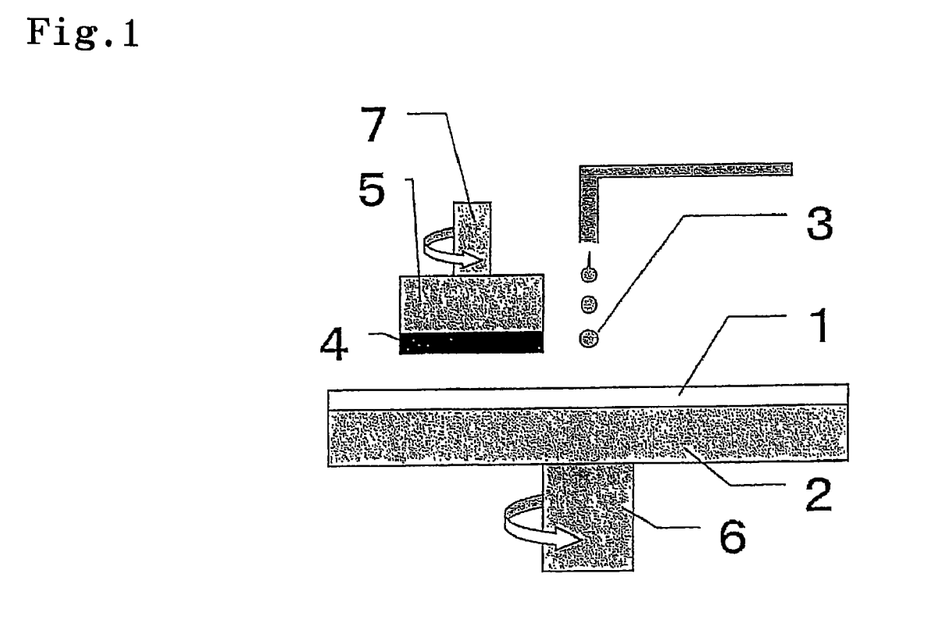
FIG. 1 is a schematic structure view showing one example of polishing device used in CMP polishing.

A semiconductor device is fabricated after operation in a step of polishing a surface of a semiconductor wafer with a polishing pad. The term, a semiconductor wafer, generally means a silicon wafer on which a wiring metal and an oxide layer are stacked. No specific limitation is imposed on a polishing method of a semiconductor wafer or a polishing apparatus, and polishing is performed with a polishing apparatus equipped, as shown in FIG. 1, with a polishing platen 2 supporting a polishing pad (a polishing layer) 1, a polishing head 5 holding a semiconductor wafer 4, a backing material for applying a uniform pressure against the wafer and a supply mechanism of a polishing agent 3. The polishing pad 1 is mounted on the polishing platen 2 by adhering the pad to the platen with a double sided tape. The polishing platen 2 and the polishing head 5 are disposed so that the polishing pad 1 and the semiconductor wafer 4 supported or held by them oppositely face each other and provided with respective rotary shafts 6 and 7. A pressure mechanism for pressing the semiconductor wafer 4 to the polishing pad 1 is installed on the polishing head 5 side. During polishing, the semiconductor wafer 4 is polished by being pressed against the polishing pad 1 while the polishing platen 2 and the polishing head 5 are rotated and a slurry is fed. No specific limitation is placed on a flow rate of the slurry, a polishing load, a polishing platen rotation number and a wafer rotation number, which are properly adjusted.

Protrusions on the surface of the semiconductor wafer 4 are thereby removed and polished flatly. Thereafter, a semiconductor device is produced therefrom through dicing, bonding, packaging etc. The semiconductor device is used in an arithmetic processor, a memory etc.

EXAMPLES

Description will be given of the invention with examples, while the invention is not limited to description in the examples.

[Measurement and Evaluation Methods]

(Measurement of Combustion Residue)

In a crucible (B-type, model number CW-B4, outer diameter $\phi$72 mm×height 59 mm, capacity 155 ml), 1 g of silicon-based surfactant was accurately weighed, and filter paper (FILTER PAPER ADVANTEC, quantification filter paper No. 7, 125 mm, available from ToyoRoshi) cut into 10 mm square was put thereon, and then a lid was closed to prepare a sample. The sample was put into an electric furnace, burned at 350° C. for an hour, and burned for another one hour at 650° C. after opening the lid, and then burned for 30 minutes at 700° C. Thereafter, the weight of the combustion residue remaining in the crucible was quantified. Then the ratio (weight %) of combustion residue relative to initial weight (1 g) was calculated.

(Measurement Method of EO/PO)

Molar ratio (EO/PO) between ethyleneoxide (EO) and propyleneoxide (PO) in a silicon-based surfactant which is a copolymer of polyalkylsiloxane and polyether was determined by NMR. As a measuring device, FT-NMR DPX400S (available from BURKER) was used, and 2 wt % solution of silicon-based surfactant was dissolved in $CDCl_3$ was prepared as a sample. Measuring condition was as follows: integrating number: 64, pulse angle 30 degrees, pulse waiting time 1.0 second. EO/PO is calculated by the following formula.

$$EO/PO=[(P1\text{-}P2\text{-}P5)/4]/(P2/3)$$

(wherein P1, P2, P5 attribute to H in the following structure formula:

[Formula 1]

(wherein X represents an alkylene group, and R represents H or a alkyl group. The ethyleneoxide group and the propyleneoxide group may have a block structure or a random structure.)

P1: integrated value of H (3.0 to 4.0 ppm) of —OCH$_2$— group, and —OCH— group.

P2: integrated value of H (around 1.1 ppm) of C—CH$_3$ group.

P5: integrated value of H (around 0.45 ppm) of Si—CH$_2$— group in Si—X group.

(Measurement of Average Cell Diameter)

A manufactured polyurethane resin foam was sliced with a microtome cutter into measurement samples each with the thinnest possible thickness of 1 mm or less. A surface of a sample was photographed with a scanning electron microscope (manufactured by Hitachi Science System Co. with a model number of S-3500N) at a magnification of × 100. An effective circular diameter of each of all cells in an arbitrary area was measured with an image analyzing soft (manufactured by MITANI Corp. with a trade name WIN-ROOF) and an average cell diameter was calculated from the measured values.

(Measurement of Specific Gravity)

Determined according to JIS Z8807-1976. A manufactured polyurethane resin foam cut out in the form of a strip of 4 cm×8.5 cm (thickness: arbitrary) was used as a sample for measurement of specific gravity and left for 16 hours in an environment of a temperature of 23±2° C. and a humidity of 50%±5%. Measurement was conducted by using a specific gravity hydrometer (manufactured by Sartorius Co., Ltd).

(Measurement of Hardness)

Measurement is conducted according to JIS K6253-1997. A manufactured polyurethane resin foam cut out in a size of 2 cm×2 cm (thickness: arbitrary) was used as a sample for measurement of hardness and left for 16 hours in an environment of a temperature of 23±2° C. and a humidity of 50%±5%. At the time of measurement, samples were stuck on one another to a thickness of 6 mm or more. A hardness meter (Asker D hardness meter, manufactured by Kobunshi Keiki Co., Ltd.) was used to measure hardness.

(Evaluation of Polishing Characteristic)

Polishing characteristic was evaluated using the prepared polishing pad with the use of SPP600S (available from Okamoto Machine Tool Works, Ltd.) as a polishing apparatus. Polishing rate was calculated from the time required for polishing 0.5 μm in each of 8 inches of silicon wafer having 1 μm of a thermally oxidized membrane. Polishing rates at tenth wafer, 100th wafer, 300th wafer and 500th wafer are shown in Table 1. For measurement of thickness of an oxidized membrane, an interference film thickness measuring instrument (available from OTSUKA ELECTRONICS Co., Ltd.) was used. As for polishing condition, silica slurry (SS12 manufactured by Cabot) was added at a flow rate of 150 ml/min during polishing. Polishing loading was 350 g/cm$^2$, the number of revolutions of the polishing platen was 35 rpm, and the number of revolutions of the wafer was 30 rpm.

In addition, for assessing planarity, a thermally oxidized membrane was deposited 0.5 μm on a 8 inch silicon wafer, patterning of L/S (line and space)=25 μm/5 μm and L/S=5 μm/25 μm was performed, and an oxidized membrane (TEOS) was further deposited 1 μm to prepare a wafer with a pattern at an initial step of 0.5 μm. This wafer was polished under the aforementioned polishing condition, and an abrasion amount of a bottom part of a 25 μm space was measured at a global step of 2000 Å or smaller, thereby, planarity was assessed. As a value of an abrasion amount is smaller, planarity can be said to be excellent.

Figure 2:
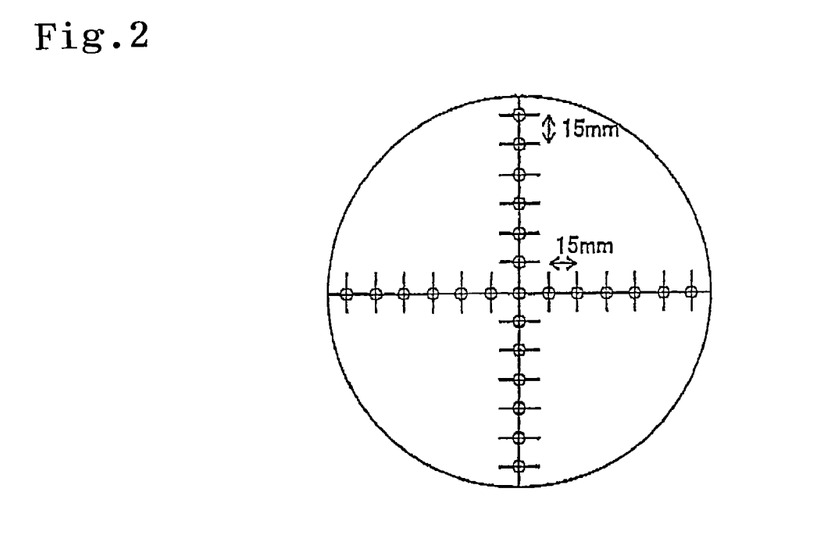
FIG. 2 is a schematic view showing 25 positions at which film thickness of wafer is measured.

Evaluation of in-plane uniformity was carried out in the following manner. Using a 8-inch silicon wafer on which 1 μm of a thermally oxidized membrane was deposited, polishing was conducted under the aforementioned polishing conditions until the thermally oxidized membrane was 0.5 μm, and from measurements of membrane thickness before and after polishing at 25 specified positions on the wafer as shown in FIG. 2, maximum polishing rate and minimum polishing rate were determined. These maximum and minimum rates were assigned to the formula below to determine in-plane uniformity. In-plane uniformity in 100th wafer is shown in Table 1. The smaller the value of the in-plane uniformity, the better the in-plane uniformity is.

In-plane uniformity (%)={(maximum polishing rate−minimum polishing rate)/(maximum polishing rate+minimum polishing rate)}×100

(Evaluation of Clogging)

Whether clogging occurred in the groove on the surface of polishing pad after 500 pieces polishing was visually checked, and evaluated according to the following criteria.

○: clogging observed in less than 10% of the entire groove

Δ: clogging observed in 10% or more and less than 20% of the entire groove x: clogging observed in not less than 20% of the entire groove Example 1

A reaction vessel was charged with 100 parts by weight of polyether isocyanate-terminated prepolymer (available from UNIROYAL, Adiplene L-325, NCO concentration: 2.22 meq/g) and 3 parts by weight of silicon-based surfactant (available from TORAY Dow Corning Silicone Co., Ltd., SZ-1645, combustion residue:17.2 wt %) and mixed, and defoamed under reduced pressure after adjusting the temperature to 80° C. Then the mixture was drastically stirred for about 4 minutes using a stirring blade at rotation speed of 900 rpm, so that bubbles were taken into the reaction system. To this mixture, 26 parts by weight of 4,4'-methylene bis(o-chloroaniline) (available from IHARA CHEMICAL INDUSTRY CO., LTD., IHARA CUAMINE MT) that was preliminarily fused at 120° C. was added. The mixture was stirred for about 1 minute, and poured into an open mold (cast molding container) of pan form. At the time when the mixture lost the fluidity, the mold was put into an oven and subjected to post curing at 110° C. for 6 hours, to give a block of polyurethane resin foam. The polyurethane resin foam block was sliced with the use of a slicer of bandsaw type (available from Fecken), to give a polyurethane resin foam sheet. Then the surface of the sheet was buffed using a buffing machine (available from AMITEC) to a thickness of 1.27 mm, to give a sheet with adjusted thickness accuracy. The buffed sheet was punched into a size of 61 cm in diameter, and the surface was processed using a groove processing machine to have concentric grooves at groove width of 0.25 mm, groove pitch of 1.50 mm, and groove depth of 0.40 mm, to give a polishing sheet. On the other face of the polishing sheet than the face on which the groove processing was made, a double sided tape (SEKISUI CHEMICAL CO., LTD., double tack tape) was attached using a laminator. Further, surface of a corona-processed cushion sheet (available from TORAY, polyethylene foam, TORAYPEF, thickness 0.8 mm) was buffed, and the resultant sheet was joined with the above two-sided tape using a laminator. Further, a double sided tape was attached on the other face of the cushion sheet using a laminator, to give a polishing pad.

Example 2

A polishing pad was prepared in a similar manner to as in Example 1 except that 3 parts by weight of silicon-based surfactant (available from Gold schmidt, B-8465, combustion residue: 17.0 wt %) was used in place of SZ-1645 (3 parts by weight) in Example 1.

Example 3

A polishing pad was prepared in a similar manner to as in Example 1 except that 3 parts by weight of silicon-based surfactant (available from TORAY Dow Corning Silicone Co., Ltd., SZ-1718, combustion residue: 15.9 wt %) was used in place of SZ-1645 (3 parts by weight) in Example 1.

Example 4

A polishing pad was prepared in a similar manner to as in Example 1 except that 3 parts by weight of silicon-based surfactant (available from TORAY Dow Corning Silicone Co., Ltd., SF-2938F, combustion residue: 14.0 wt %) was used in place of SZ-1645 (3 parts by weight) in Example 1.

Example 5

A polishing pad was prepared in a similar manner to as in Example 1 except that 3 parts by weight of silicon-based surfactant (available from TORAY Dow Corning Silicone Co., Ltd., SF-2937F, combustion residue: 13.4 wt %) was used in place of SZ-1645 (3 parts by weight) in Example 1.

Comparative Example 1

A polishing pad was prepared in a similar manner to as in Example 1 except that 3 parts by weight of silicon-based surfactant (available from TORAY Dow Corning Silicone Co., Ltd., SH-193, combustion residue: 7.9 wt %) was used in place of SZ-1645 (3 parts by weight) in Example 1.

Comparative Example 2

A polishing pad was prepared in a similar manner to as in Example 1 except that 3 parts by weight of silicon-based surfactant (available from TORAY Dow Corning Silicone Co., Ltd., SH-192, combustion residue: 7.3 wt %) was used in place of SZ-1645 (3 parts by weight) in Example 1.

Comparative Example 3

A polishing pad was prepared in a similar manner to as in Example 1 except that 3 parts by weight of silicon-based surfactant (available from Nippon Unicar Co., Ltd., L-5340, combustion residue: 7.0 wt %) was used in place of SZ-1645 (3 parts by weight) in Example 1.

Comparative Example 4

A polishing pad was prepared in a similar manner to as in Example 1 except that 3 parts by weight of silicon-based surfactant (available from TORAY Dow Corning Silicone Co., Ltd., BY10-540, combustion residue: 4.5 wt %) was used in place of SZ-1645 (3 parts by weight) in Example 1.

Comparative Example 5

A polishing pad was prepared in a similar manner to as in Example 1 except that 3 parts by weight of silicon-based surfactant (available from TORAY Dow Corning Silicone Co., Ltd., SF-2962, combustion residue: 2.1 wt %) was used in place of SZ-1645 (3 parts by weight) in Example 1.

TABLE 1

| | Combustion residue (wt %) | EO/PO | Average cell diameter (µm) | Number of cells (cells/mm$^2$) | Specific gravity | D hardness (degree) | Polishing rate (Å/min) 10th | 100th | 300th | 500th | Planarity (Å) | In-plane uniformity (%) | Clogging |
|---|---|---|---|---|---|---|---|---|---|---|---|---|---|
| Example 1 | 17.2 | 80/20 | 40.2 | 320 | 0.86 | 53 | 2450 | 2370 | 2270 | 2200 | 2150 | 7 | ○ |
| Example 2 | 17.0 | 74/26 | 40.1 | 280 | 0.86 | 53 | 2260 | 2180 | 2090 | 2010 | 2210 | 6 | ○ |
| Example 3 | 15.9 | 77/23 | 41.1 | 300 | 0.87 | 54 | 2310 | 2250 | 2150 | 2050 | 2250 | 6 | ○ |
| Example 4 | 14.0 | 76/24 | 44.5 | 270 | 0.86 | 53 | 2210 | 2150 | 2050 | 1950 | 2200 | 7 | ○ |
| Example 5 | 13.4 | 75/25 | 44.8 | 260 | 0.86 | 54 | 2300 | 2210 | 2130 | 2060 | 2250 | 6 | ○ |
| Comparative example 1 | 7.9 | 100/0 | 51.7 | 210 | 0.86 | 52 | 2100 | 2010 | 1860 | 1620 | 2540 | 9 | Δ |
| Comparative example 2 | 7.3 | 60/40 | 52.2 | 230 | 0.86 | 53 | 2150 | 2030 | 1940 | 1700 | 2620 | 9 | Δ |
| Comparative example 3 | 7.0 | 81/19 | 50.2 | 225 | 0.86 | 53 | 2200 | 2080 | 1970 | 1730 | 2500 | 9 | Δ |
| Comparative example 4 | 4.5 | 70/30 | 58.7 | 147 | 0.87 | 53 | 1600 | 1460 | 1300 | 1120 | 2760 | 10 | x |
| Comparative example 5 | 2.1 | 20/80 | 67 | 89 | 0.86 | 52 | 1300 | 1160 | 1050 | 940 | 3000 | 12 | x |

The results shown in Table 1 demonstrate that according to the polishing pad of the present invention, abrasive particles or grinding dusts are unlikely to clog the groove during polishing, and polishing rate is unlikely to decrease even after long-term continuous use.

The invention claimed is:

1. A polishing pad having a polishing layer formed of a polyurethane resin foam having fine-cells, a polishing surface of the polishing layer being formed with an asperity structure, wherein the polyurethane resin foam is a reaction cured product between an isocyanate-terminated prepolymer containing a high-molecular-weight polyol component and an isocyanate component and a chain extender, and the polyurethane resin foam further comprises a silicone-based surfactant having a combustion residue of not less than 8 wt %.

2. The polishing pad according to claim 1, wherein the silicone-based surfactant is a copolymer of polyalkylsiloxane and polyether having a molar ratio of ethyleneoxide to propyleneoxide in the polyether in the range of 60/40 to 100/0.

3. The polishing pad of claim 1, wherein the polyurethane resin foam contains 0.05 wt % or more and less than 10 wt % of the silicone-based surfactant.

4. The polishing pad of claim 1, wherein the polyurethane resin foam has an average cell diameter of 50 μm or less and a cell number of 200 cells/mm$^2$ or more.

5. A method of producing a semiconductor device comprising polishing a surface of a semiconductor wafer with the polishing pad of claim 1.

* * * * *

UNITED STATES PATENT AND TRADEMARK OFFICE
CERTIFICATE OF CORRECTION

PATENT NO. : 8,094,456 B2
APPLICATION NO. : 12/095859
DATED : January 10, 2012
INVENTOR(S) : Takeshi Fukuda et al.

It is certified that error appears in the above-identified patent and that said Letters Patent is hereby corrected as shown below:

IN THE SPECIFICATIONS:

At column 5, line 54, please replace "triethyleneglycol-di-p-aminobenzoate," with -- trimethyleneglycol-di-p-aminobenzoate, --

Signed and Sealed this
First Day of May, 2012

David J. Kappos
*Director of the United States Patent and Trademark Office*